United States Patent [19]

Gilson

[11] Patent Number: 4,519,055
[45] Date of Patent: May 21, 1985

[54] OPTICAL DISC TRANSPORT SYSTEM
[75] Inventor: Alan P. Gilson, King of Prussia, Pa.
[73] Assignee: The United States of America as represented by the Secretary of the Air Force, Washington, D.C.
[21] Appl. No.: 486,477
[22] Filed: Apr. 19, 1983
[51] Int. Cl.³ ............................................. G11B 17/00
[52] U.S. Cl. .......................................... 369/37; 369/39
[58] Field of Search ............................. 369/36, 37, 39

[56] References Cited

U.S. PATENT DOCUMENTS

| | | | |
|---|---|---|---|
| 1,799,148 | 4/1931 | Bryant | 369/37 |
| 2,796,263 | 6/1957 | Moore | 274/1 |
| 2,839,305 | 6/1958 | Andres | 369/37 |
| 2,899,074 | 8/1959 | Gullixson | 211/40 |
| 2,937,026 | 5/1960 | Acker | 274/10 |
| 2,992,006 | 7/1961 | Foufounis | 369/37 |
| 3,484,055 | 12/1969 | Raine | 369/37 |
| 3,774,172 | 11/1973 | Silverman | 340/173 LM |
| 4,271,489 | 6/1981 | Siryj et al. | 369/38 |
| 4,273,342 | 6/1981 | Gilson et al. | 369/32 |
| 4,286,790 | 9/1981 | Siryj et al. | 369/36 |

OTHER PUBLICATIONS de Vos, "Megadoc, a Modular System for Electronic Document Handling", *Phillips Technical Review,* vol. 39, 1980, No. 12, pp. 329–343.
Manuel, John, "Optical Disk Stores Images and Data for Rapid Retrieval," *Electronics,* Oct. 20, 1982, pp. 47–48.

*Primary Examiner*—Steven L. Stephan
*Attorney, Agent, or Firm*—Donald J. Singer; Stanton E. Collier

[57] ABSTRACT

A carrousel disc transport system has a donut shaped cartridge storage module, a changer and a record/read station. The changer is centrally located in said donut shaped module and selectively removes or replaces selected cartridges. A carrier of the changer has a carriage that is translated along a ball screw to be positioned over the storage module. A pair of transporting arms connected to drive means engages the selected cartridge in the module. The driving means of the ball screw transfer the carriage with the arms to move the cartridge to a transfer location where a second transporting means moves the cartridge to the record/read station. The reverse is required to replace the selected cartridge in the module.

1 Claim, 5 Drawing Figures

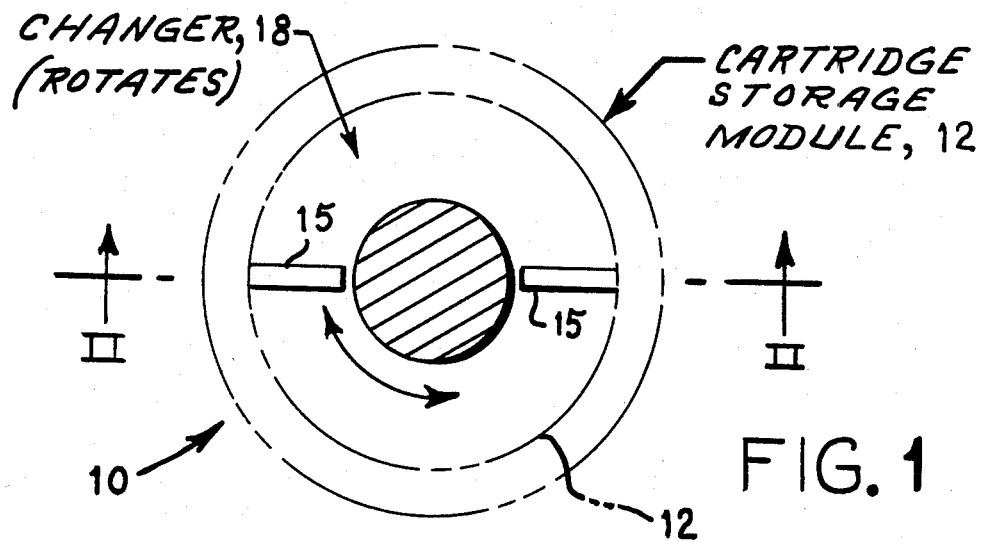
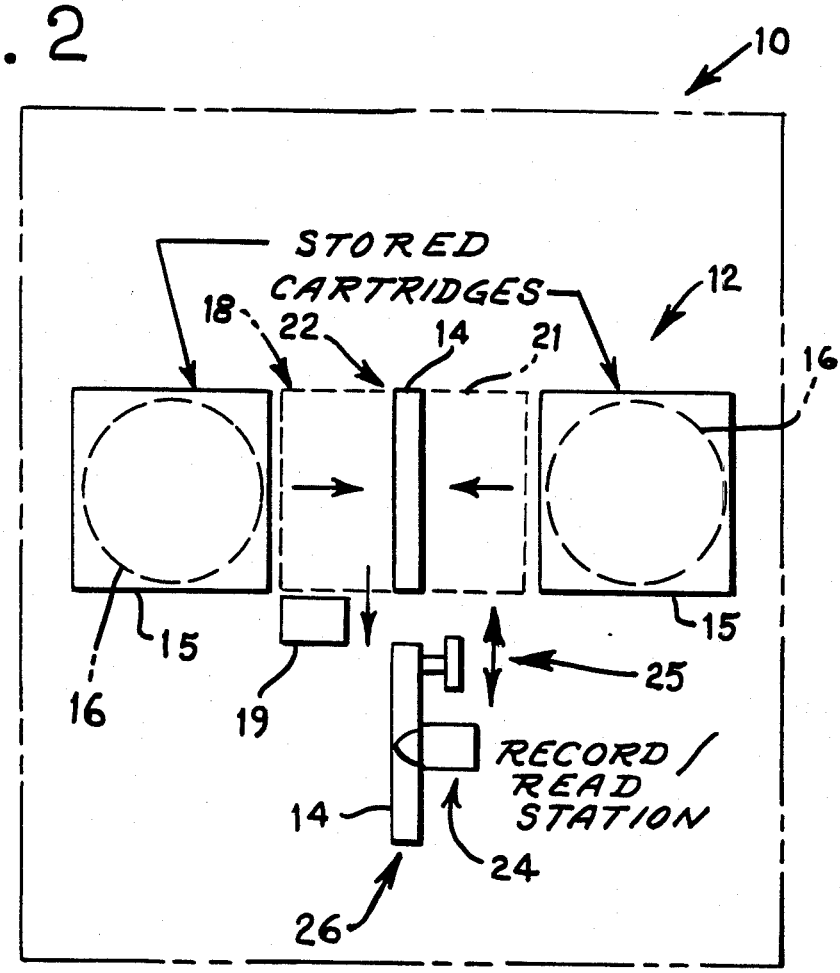

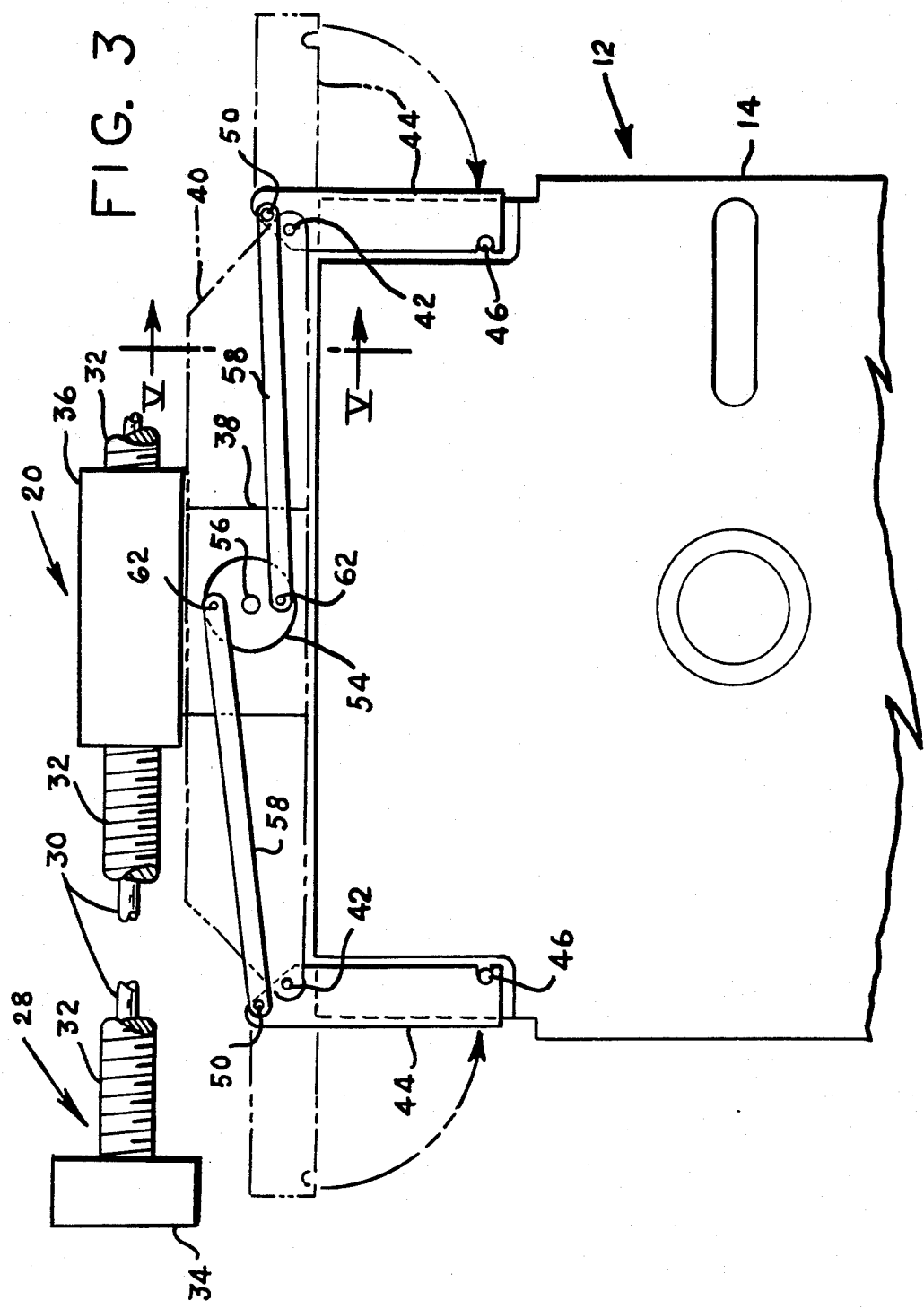

OPTICAL DISC TRANSPORT SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to information storage and retrieval systems and particularly to an apparatus thereof which may be employed to recover data from information tracks on an optical disc record.

A large-capacity data-storage system consists of a data base and a system for management and access of this data. In operation, users request stored data via a controller unit which is typically a data-management computer. Depending on the nature of a request, data is extracted from the mass memory and routed to the user.

Memories of currently existing systems are configured around magnetic storage media, and the variant forms of magnetic storage that conveniently accommodate the stored information. However, by the mid-1980s it is expected that the long-term or archival storage capacity and access rate capability of magnetic mass memories will be exceeded. Several goals have been established for possible systems: 3-second access time, potential library size of $10^{14}$ bits, long-term stability (10 to 15 years), high input/output rates (50 Mb/s), and bit error rate of about $10^{-10}$.

The requirement for 3-second access and 10-to-15 year archival quality represents major improvements over current magnetic-type systems. Access time, especially, is a major driving force in selection of the basic storage medium and in how stored data is accessed.

Of data formats in use today, the disk offers fastest access times to large amounts of stored data. Data is accessible in times typically on the order of tens of milliseconds to seconds, depending on the state of readiness of the disk when the information request is made. If the amount of information per disk can be substantially increased beyond the capacity of today's system, a disk-based mass memory becomes an attractive solution to the problems of achieving all of the desirable features listed above.

New technology presents several candidates for fast-access nonmagnetic mass memory disk storage media and systems. Generation of a system design involves selection of one of these media and solution of the electronic/mechanical handling and interfacing problems associated with the selected medium. Of the media candidates, it is believed that the optical disk is the most promising for archival digital data storage. Extrapolation from systems currently existing shows that the likelihood of successful application of the optical disk medium is high.

The information storage and retrieval system typically includes a storage module for storing a plurality of optical discs in protective cartridges in a particular arrangement. In order to access the cartridges, a disc changer has a carrier with at least two positioning and retracting carriers. These carriers have gripping means coupled to the carriers for gripping the cartridges. Each carrier has driving means to move the carrier and gripping means to the desired position. After the cartridge is gripped it is moved to an optical disc reader for reading data stored on the optical disc.

An example of an optical disc system is shown by U.S. Pat. No. 4,286,790, entitled, "Optical Disc Changer Apparatus," assigned to RCA, Inc. This apparatus stores the cartridges along a horizontal row and a changer moving in the "x" and "y" axes extracts the selected cartridge that is then positioned in a reader. The operation is reversed to store the cartridge.

The above system performs in the intended manner but involves time consuming movement along the horizontal row of cartridges.

The present invention is directed toward providing a carrousel type optical disc transport system that reduces linear movement to obtain a desired cartridge.

SUMMARY OF THE INVENTION

The instant invention sets forth a carrousel type optical disc system which minimizes distance traveled in cycling optical discs to and from a record/read station.

A radially arrayed cartridge storage module being essentially donut shaped has stored therein about 100 cartridges having optical discs therein. The cartridges provide an almost dust free environment and a protective cover for each disc stored therein. The cartridge has an alignment and retaining means used in storing and handling the cartridge, a head slot, and a drive shaft port for engagement with the disc which can be rotated within the cartridge by a drive shaft of the record/read station.

Centered in the storage module is a changer that rotates about a center axis. The changer has gripping means attached to a carrier that withdraws and inserts the selected cartridge in the storage module.

The carrier has a movable carriage that translates along a ball screw drive and guide rod. At predetermined positions on the screw, the gripping means is activated either to close or open its grip on the selected cartridge.

The cartridge carrier's gripping means acts through, for example, gear means and connecting rods to cause a pair of arms to attach to the selected cartridge. The ball screw drive moves the selected cartridge to a second gripping means that positions the selected cartridge in a record/read station.

It is therefore one object of the present invention to provide for a radial array type optical disc transport system;

Another object of this invention is to provide for a transport that minimizes translation along a cartridge storage module; and A further object of this invention is to provide for a gripping means that operates without undue complications.

These and many other objects and advantages of the present invention will be readily apparent to one skilled in the pertinent art from the following detailed description of a preferred embodiment of the invention and related drawings.

BRIEF DESCRIPTION OF THE DRAWINGS

FIG. 1 is a plan view showing diagramatically the storage module and changer of this invention;

FIG. 2 is a cross-section view showing diagramatically the storage module and record/read station of the transport system taken along lines II—II of FIG. 1;

FIG. 3 is a view of the gripping means attached to the carriage of the changer of this invention;

DETAILED DECRIPTION OF THE PREFERRED EMBODIMENT

Figure 4:
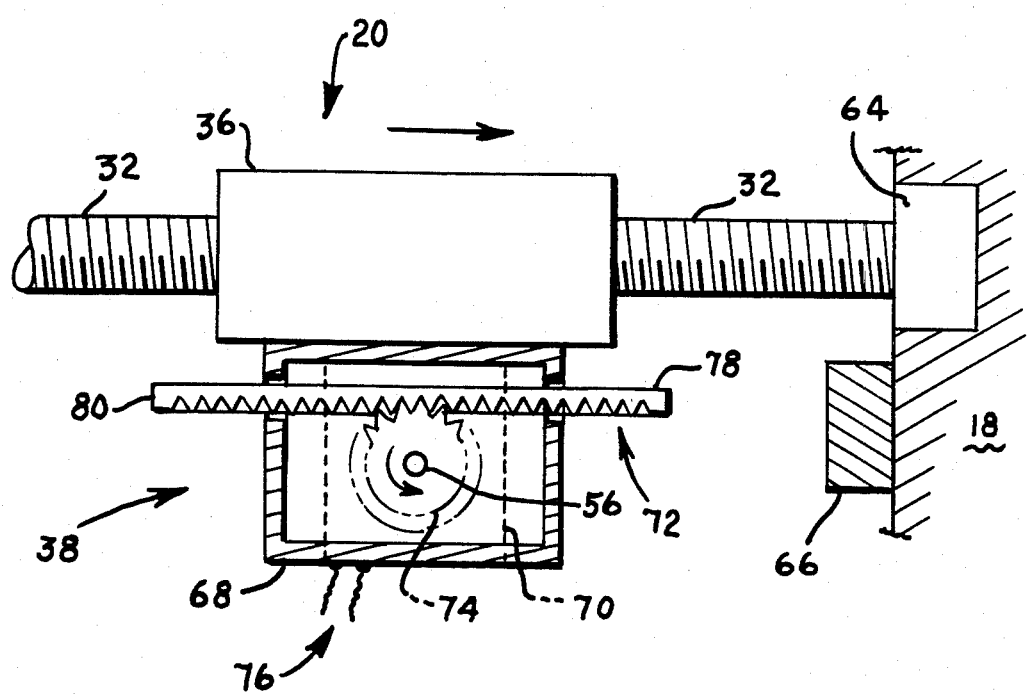
FIG. 4 is a front view of a gearing means of the gripping means of this invention.

Referring to FIG. 1, an optical disc transport system 10 is shown diagramatically from a top view.

A cartridge storage module 12 is donut shaped and has stored therein about 100 cartridges 15, vertically positioned on a horizontal plane. Inside each cartridge there is an optical disc 16, shown in outline in FIG. 2. Although optical disc 16 is the preferred storage medium, other storage medium is clearly possible. If not optical disc 16, the manner of recording/reading the data would be changed accordingly.

In order to access a selected cartridge 14, a changer 18 rotates about the vertical axis of module 12. Changer 18 has a housing 21, shown in outline in FIG. 2, that is rotated about the vertical axis of module 12 by a driving means 19, not shown in detail, such as a stepper motor.

Attached to housing 21 is a carrier 20 shown partially in FIG. 3. Referring to FIG. 2, carrier 20, not shown, removes selected cartridge 14 from module 12 and positions selected cartridge 14 at a transfer location 22.

If a record/read station 24 remains stationary with respect to module 12, changer 18 must further rotate to align selected cartridge 14 with a second carrier 25, not shown, for removing selected cartridge 14 from transfer location 22 to a record/read position 26 of station 24. Alternatively, station 24 may be mounted to housing 21 of changer 18. This method eliminates rotating changer 18 to align with station 24. It will be assumed that this alternative is preferred because of the decreased access time. To replace selected cartridge 14 into module 12, second carrier 25 of station 24 positions selected cartridge 14 to transfer location 22 from position 26. Thereafter, carrier 20 of changer 18 moves selected cartridge 14 from transfer location 22 to an empty location in module 12. Selected cartridge 14 need not be returned to the same position in module 12 if there are other vacancies. The present address of cartridge 14 would be stored in memory for future access.

Referring to FIG. 3, carrier 20 is attached to housing 21, shown in FIG. 2, of changer 18 and includes a conventional ball screw and drive 28 and a guide bar 30, positioned behind a screw 32 for purposes of illustrations. A part of carrier 20 is positioned above module 12 so that drive 34 by rotating screw 32 causes a carriage 36 to translate along screw 32 to a desired position. Carriage 36 has a hole therethrough, not shown, so that guide bar 30 prevents the rotation of carriage 36 about screw 32. Attached to the bottom of carriage 36 is drive means 38 to be explained hereinafter.

Also attached to carriage 36 is a frame 40, shown in outline in FIG. 3, that provides support to two pivot pins 42. A transport arm 44 is pivoted about each pivot pin 42 and is shown connected to engagement pins 46 of selected cartridge 14 and shown in outline in a released position.

Each transport arm 44 is attached to a connecting rod 58 at a pivot pin 50. The other end of connecting rod 58 is connected to a pivot pin 62 eccentrically mounted on a flange 54 is connected to a shaft 56 from drive means 38. Rotation of shaft 56 causes flange 54 to rotate. Although only a pair of connecting rods 58 are shown, other arrangements of connecting rods are possible in light of the requirement to rotate transport arms 44 about pivot pins 42.

To provide the rotation to transport arms 44, a quarter turn clockwise rotation of flange 54 causes transport arms 44 to rotate to about the horizontal position. A counter clockwise rotation thereafter positions transport arms 44 in the position shown, engaged on engagement pins 46 of cartridge 14. Drive means 38 is activated only when picking up or releasing selected cartridge 14.

In order to rotate drive shaft 56, drive means 38 may be a conventional reversible stepper motor. One possible electromechanical version of drive means 38 is shown in FIG. 4.

Selected cartridge 14 can be removed from module 12 when carrier 20 is driven into a first stop 66 attached to a part of changer 18 that is positioned over module 12. As screw 32 rotates in a bearing 64, a first end 78 of a rack gear 72 comes into contact with first stop 66. Continued rotation of screw 32 causes rack 72 to turn a pinion gear 74 about shaft 56 in a counter clockwise direction. This in turn causes transport arms 44 to move to the vertical position and lock on to engagement pins 46 of selected cartridge 14.

Thereafter, screw 32 is reversed in direction which causes carrier 20 to move to the center of changer 18 and remove cartridge 14 from module 12. As carrier 20 reaches the center of changer 18, a second end 80 of rack 72 comes into contact with a second stop 82, not shown, which causes a clockwise rotation of pinion gear 74. This rotation makes transport arm 44 release selected cartridge 14. Second carrier 25 then moves selected cartridge 14 into a record/read station 24, shown in FIG. 2, in cooperation with carrier 20.

After the record/read operation is completed second carrier 25 moves selected cartridge 14 back into position 22, FIG. 2, for insertion into module 12 by carrier 20. A stepper motor 70, shown in outline in FIG. 4, is attached to a housing 68 of drive means 38. First electrical signals sent through leads 76 cause a counter clockwise rotation of pinion gear 74. It is assumed that second stop 82 is repositioned to allow rack 78 to move to the left and thus have transport arms 44 lock onto engagement pins 46. Screw 32 then moves carriage 36 to module 12 until first end 78 of rack 72 almost contacts first stop 66. Transport arms 44 then release selected cartridge 14 when second electrical signals cause stepper motor 70 to turn clockwise. After selected cartridge 14 is returned to the module 12, carrier 20 is transported to the center of changer 18 awaiting another cycle.

Shaft 56 may also be connected to a reversible stepper motor that is actuated by electrical signals sent in response to direction of rotation of screw 32 and position of carriage 36 to either pickup or release selected cartridge 14.

Figure 5:
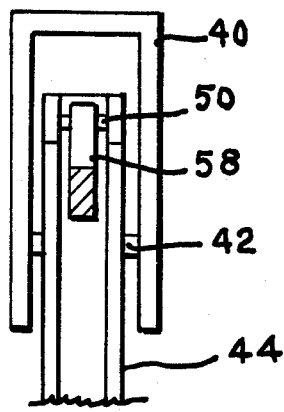
FIG. 5 is a cross-section of the gripping means taken along lines V—V of FIG. 3.

The manner of connecting frame 40, connecting rods 58, transport arms 44, and pins 42 and 50 is shown in FIG. 5 which is a cross section taken along lines V—V of FIG. 3.

The operational cycle of carrier 20 is described hereinabove wherein selected cartridge 14 is removed from module 12, moved to transfer location 22 centrally located in changer 18, released to second carrier 25, picked up from second carrier 25 after the record/read operation, and transported back to module 12.

Clearly, many modifications and variations of the present invention are possible in light of the above teachings and it is therefore understood, that within the inventive scope of the inventive concept, the invention may be practiced otherwise than specifically claimed.

What is claimed is:

1. An optical disc transport system comprising a cartridge storage module, said cartridge storage module having a plurality of rectangular shaped cartridges removably stored therein, said cartridges having discs contained therein, said storage module being donut shaped, a changer, said changer being centrally located in said cartridge storage module, said changer being rotatably driven for accessing said cartridges, said changer reciprocally transporting a selected cartridge between said cartridge storage module and a transfer location within said changer, said changer having a housing centrally located in said cartridge storage module; driving means for selectively rotating said housing within said cartridge storage module; and means for transporting said selected cartridge, said means for transporting attached to said housing, said means for transporting having a reciprocating transporting means for moving said selected cartridge between said cartridge storage module and said transfer location; and means for releasably engaging said selected cartridge, said means for releasably engaging attached to and translating on said reciprocating transporting means; said reciprocating transporting means including a ball screw and a drive, said drive selectively rotating said ball screw whereby a carrier translates upon said ball screw, said carrier including a carriage translatably attached to said reciprocating transporting means;

a frame fixedly attached to said carriage;

means for selectively rotating a shaft, said means for selectively rotating fixedly attached to said carriage;

a pair of transporting arms for releasably engaging said selected cartridge, said transporting arms pivoted on one end to said frame; and means for connecting said shaft to said transporting arms, said means for connecting including a plurality of connecting rods rotatably connected to a flange, said flange fixedly mounted to said shaft, said connecting rods operably connected to said transporting arms such that selective rotation of said flange by said shaft causes said transporting arms to releasably engage said selected cartridge, said connecting means pivoted to one end to said transporting arms near said pivot connecting said arms to said frame whereby motion of said connecting means causes said arms to rotate about said pivots in said frame; and a data interface unit, said data interface unit attached to said changer, said data interface unit reversibly transporting said selected cartridge from said transfer location in said changer to a read/record station within said data interface unit.

* * * * *